United States Patent
Liittschwager et al.

(10) Patent No.: US 6,485,800 B1
(45) Date of Patent: Nov. 26, 2002

(54) ARTICLES OF COMPOSITE STRUCTURE HAVING APPEARANCE OF WOOD

(75) Inventors: Tommy L. Liittschwager, Escondido, CA (US); Amado Domas, San Diego, CA (US); Tim McCleery, San Diego, CA (US); Dennis W. Albright, San Diego, CA (US)

(73) Assignee: Jeld-Wen, inc., Klamath Falls, OR (US)

( * ) Notice: Subject to any disclaimer, the term of this patent is extended or adjusted under 35 U.S.C. 154(b) by 59 days.

(21) Appl. No.: 09/779,199

(22) Filed: Feb. 7, 2001

(Under 37 CFR 1.47)

(51) Int. Cl.[7] .................................................. A01A 1/00
(52) U.S. Cl. ...................... 428/15; 428/58; 428/423.7; 428/480
(58) Field of Search .................... 428/76, 58, 423.9, 428/480, 292.4, 15, 423.7, 206, 207; 52/309.1; 264/122

(56) References Cited

U.S. PATENT DOCUMENTS

| | | | |
|---|---|---|---|
| 3,846,524 A | 11/1974 | Elmore et al. | 264/45.3 |
| 3,859,401 A | 1/1975 | Gallap et al. | 264/45.3 P |
| 3,861,977 A | 1/1975 | Wiley | 156/242 |
| 3,916,418 A | 10/1975 | Erdmann et al. | 343/912 |
| 3,950,894 A | 4/1976 | DiMaio | 49/501 |
| 4,073,049 A | 2/1978 | Lint | 29/458 |
| 4,091,142 A | 5/1978 | Elmore et al. | 428/322 |
| 4,655,024 A | 4/1987 | Grace et al. | 52/745 |
| 4,656,722 A | 4/1987 | Armstrong | 29/527.2 |
| 4,817,360 A | 4/1989 | Gorman | 52/747 |
| 4,879,152 A | 11/1989 | Green | 428/73 |
| 5,254,798 A | 10/1993 | Zoback | 588/259 |
| 5,342,565 A | 8/1994 | Goren | 264/74 |
| 5,399,373 A | 3/1995 | Mrozinski | 427/140 |
| 5,476,895 A | 12/1995 | Ghahary | 524/437 |
| 5,600,921 A | 2/1997 | Vardaro | 49/380 |
| 5,625,999 A | 5/1997 | Buzza et al. | 52/793.11 |
| 5,676,899 A | 10/1997 | Mrozinski et al. | 264/226 |
| 5,904,986 A | 5/1999 | Smith | 428/423.7 |
| 5,934,040 A | 8/1999 | Chen | 52/784.13 |
| 5,976,646 A | 11/1999 | Stevens et al. | 428/31 |
| 6,024,908 A | 2/2000 | Koncelik | 264/331.11 |
| 6,068,907 A | 5/2000 | Beauregard | 428/71 |
| 6,153,682 A | 11/2000 | Bannat et al. | 524/492 |

FOREIGN PATENT DOCUMENTS

JP 2069234 A2 3/1990

OTHER PUBLICATIONS

International Wood Products, *Aurora By IWP*, not earlier than Feb. 8, 2000.
International Wood Products Div. of JELD–WEN, inc., *Elements of Enduring Beauty*, not earlier than Jun. 2000, pp. 2, 22–24.

*Primary Examiner*—Deborah Jones
*Assistant Examiner*—Abraham Bahta
(74) *Attorney, Agent, or Firm*—Chernoff, Vilhauer, McClung & Stenzel, LLP

(57) ABSTRACT

A door or other entryway component of synthetic resin composite construction and closely resembling the appearance of stained real wood. Skin portions of doors and other structures have a surface layer of clear gel coat resin molded to include the texture of a wood grain surface. A subsurface layer adjacent the clear gel coat layer is of pigmented gel coat resin. A structural support layer of the skin is of reinforced resin. Skins of a door or similar article are mounted on frames, and dense micro porous resin foam is provided between the skins to form a solid structure such as a door. Moldings retaining glass panels in openings defined in the door or similar structure are attached to the skins by adhesively fastening the moldings to the skins. Fasteners mounted in the moldings so that there are no plugged holes in the exterior surfaces of the moldings are used to locate the moldings properly with respect to the skins by inserting the fasteners into predrilled holes in the skins. The assembled doors and other structures can be finished by staining and coating with a finish system such as a urethane varnish to provide an appearance closely resembling real wood.

5 Claims, 4 Drawing Sheets

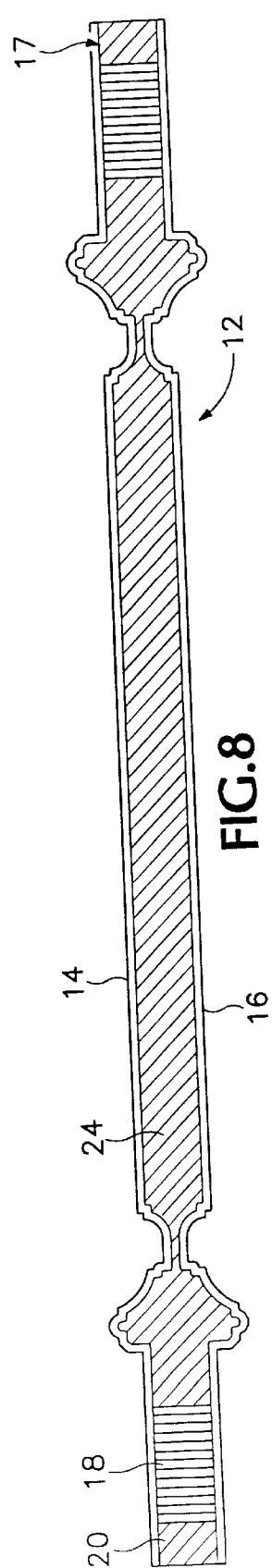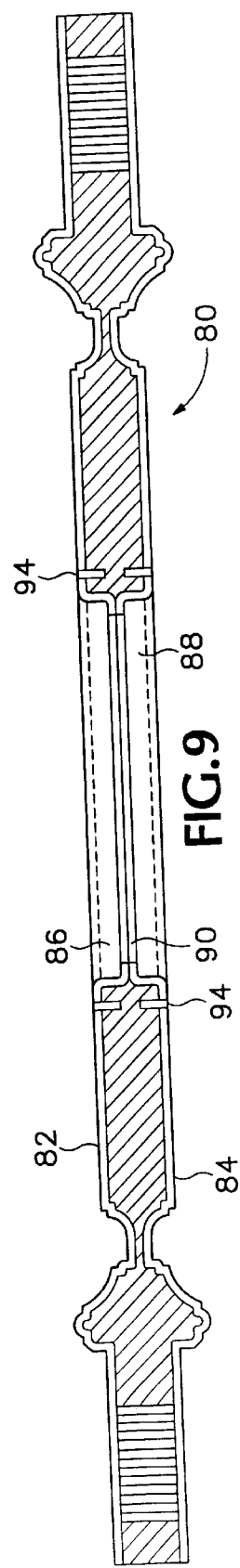

US 6,485,800 B1

ARTICLES OF COMPOSITE STRUCTURE HAVING APPEARANCE OF WOOD

BACKGROUND OF THE INVENTION

The present invention is related to articles of composite construction including reinforced synthetic resins, and in particular relates to such articles finished to resemble the appearance of real wood.

Real wood, finished by staining and provision of a protective coating such as natural or synthetic lacquer, varnish, or resin finishes, has a pleasing appearance and a substantial and solid feel. Many species of wood having a desirable appearance, however, such as most hardwoods, are expensive and require considerable amounts of skilled labor and time for production of finished articles. The appearance of wood with a bright finish, that is, a finish exposing the color and texture of the wood grain, is particularly desirable for exterior doors and entryway structures, although they may be quite expensive to construct of real wood.

While the appearance of wood is very pleasing for entryways and other exterior features of building, wood is susceptible to damage caused by weather and insect pests, which can destroy the wood or damage its finish. Frequent and often costly maintenance is thus required to prevent rapid deterioration of the appearance of real wood with a bright finish exposed to the weather.

As a more economical substitute, then, entryway doors and numerous other products for which the appearance of wood is desirable have recently been made of composite construction including outer layers of fiber-reinforced synthetic resins prepared to resemble wood. The appearance of such previously available imitation wood products, however, has at best failed to match the attractiveness of well-made structures of actual wood with a bright finish.

While some products of plastics and composite construction have been molded to include surface texture resembling the grain of wood, the appearance of depth that is so attractive in real wood has previously not been possible to reproduce in the finish of such articles. For example, Mrozinski U.S. Pat. No. 5,399,373 discloses production of imitations of natural wood by molding a resin-based gel coat to include a surface shape closely copying the surface grain texture of real wood. For this layer Mrozinski teaches the use of a pigmented gel coat material whose color is related to the color of the wood being imitated. Mrozinski's process also requires the use of artists' oil colors or similar pigments to fill the surface texture to imitate the appearance of real wood. The use of such artists' oils, however, requires considerable skill and time, and still results in an appearance somewhat lacking in realism.

Doors and other entryway components frequently include panels surrounded and supported by moldings attached to larger frame members. Such panels, particularly glass panels of doors and entryway sidelights, have to be supported securely with respect to the surrounding frames. The weight of large multi-layered glass panels, particularly when they include decorative panes assembled in metal caming, can be significant. Moldings used to attach such glass panels to frame structures must therefore be held securely in the required locations on a door or other frame structures.

While adhesives are the primary mechanism for interconnecting the parts of synthetic resin composite structures, fasteners extending through the moldings have also been required in previously known doors and other structures of composite construction in order to ensure that heavy glass panels are held securely enough. The holes through the moldings where such fasteners have been installed have then had to be plugged and finished to match the surrounding surfaces of the moldings, requiring significant time and skill.

What is desired, then, is an improved composite construction including synthetic resin surface portions that can be finished to provide an attractive pleasing appearance closely resembling finished natural wood, while avoiding the disadvantages of natural wood. It is also desired to be able to secure moldings to the skins or other components of a door or other structure of composite construction without having to use fasteners that extend through the moldings to their exterior surfaces.

SUMMARY OF THE INVENTION

The present invention provides an answer to the above-stated need for a product of composite construction having an appearance closely imitating real wood, by providing a structure for the exterior skin of a product of composite materials incorporating synthetic plastics that when finished has the appearance of real wood, and by providing a method for making such products.

As first aspect of the invention, an article manufactured of composite materials and having an appearance closely resembling real wood includes an outer layer of a transparent resin-based gel coat material whose outer surface is molded to incorporate in detail the grain shape of the surface of bare real wood. A subsurface layer adjacent to the surface layer of transparent gel coat material is of pigmented resin-based gel coat material of a color related to or resembling the color of unfinished wood of the type whose surface shape is represented. Beneath the subsurface layer is a structural supporting layer which may be of a suitable synthetic resin, reinforced as by glass or other fibers.

When an appropriate finish, such as a wood stain and a protective coating such as laquer, varnish, urethane, or another suitable synthetic resin, is applied to the outer surface of the outer layer of clear gel coat material, the resulting appearance of such a structure according to the invention has a remarkable resemblance to real wood with a similar stain and protective finish. An article constructed according to the invention and provided with such a finish presents an appearance of depth closely resembling the appearance of real wood with a similar type of finish.

In one preferred embodiment of this aspect of the invention the outer layer of transparent gel coat is substantially completely clear and colorless.

In one preferred embodiment of this aspect of the invention the outer layer of transparent gel coat has an average thickness in the range of about 0.012 to 0.020 inch, while the subsurface layer of pigmented gel resin has an average thickness in the range of about 0.003–0.010 inch.

A second major aspect of the present invention is the method of manufacturing an article of composite structure by providing a first skin sheet including an outer layer of transparent gel resin molded to incorporate a surface shape imitating the grain of real wood; providing a second skin sheet, fastening the skin sheets to opposite faces of a frame structure; filling the cavity defined between the skin sheets and within the frame structure with a structural synthetic resin foam adhering to the frame structure and the skin sheets; curing the resin foam and thereby forming a substantially rigid core structure interconnecting the skin sheets and frame; and applying a protective finish coating to the outer surface of the outer layer of at least the first skin sheet.

A third aspect of the present invention is the provision of an article of composite construction resembling an article of real wood and including fasteners fixedly mounted in moldings and used to locate the moldings precisely with respect to an article of composite construction without the use of fasteners extending entirely through such moldings so that unsightly plugs and difficult finish work are not needed.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 8 is a sectional view of a door constructed according to the invention.

FIG. 9 is a view similar to FIG. 8, showing a door according to the invention and that has an opening extending through it for receiving a glazed panel.

DETAILED DESCRIPTION OF THE PREFERRED EMBODIMENTS

Figure 1:
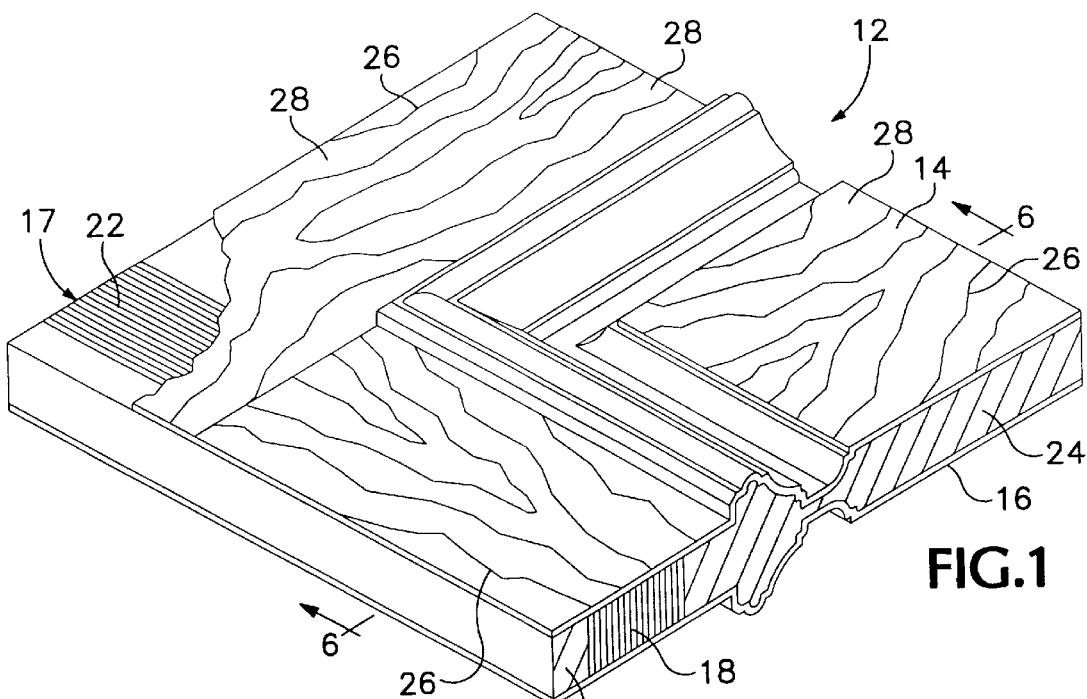
FIG. 1 is an isometric view of a portion of a door of composite construction according to the present invention.

Referring now to the drawings which form a part of the disclosure herein, shown in FIG. 1 is a corner portion of a door 12 of composite construction according to the present invention. As shown along the right hand side of FIG. 1, the structure of the door 12 is cut away to reveal its interior construction in section view. A pair of door skin sheets 14 and 16 imitating real wood are located on opposite sides of and are adhesively attached to a frame structure 17. The frame structure 17 includes a bottom rail of which an interior structural portion 18 may be of a multilayered laminated wood material. An outer surface piece 20 is of solid real wood, preferably of the species imitated by the skin sheets 14 and 16. The frame structure 17 also includes a pair of upright stiles, each preferably constructed similar to the bottom rail shown in FIG. 1, and a horizontal top rail, the stiles and rails forming a rectangular peripheral shape.

The frame structure 17 has a pair of opposite substantially planar opposite faces 22, and the skin sheets 14 and 16 are each attached to a respective one of the faces 22 by a suitable adhesive capable of permanently attaching the skins 14 and 16 to a wooden surface. For example, a suitable adhesive for attaching skin sheets 14 and 16 of the construction described below is "Plastic Welder II," available from ITW Devcon, of Danvers, Mass.

Between the skin sheets 14 and 16 and within the area surrounded by the frame structure 17 the entire space between the door skin sheets 14 and 16 is filled to form a core 24. The material of the foam core 24 is preferably a relatively dense microcellular urethane foam produced in place from a two-part self-rising composition. The foam material of the core 24 preferably adheres strongly to the interior surfaces of the skin sheets 14 and 16 and the stiles and rails of frame structure 17, and thus helps to bond the component structures of the door 12 to each other.

The outer surface of the skin sheet 14 of the finished door 12 has the appearance of real wood finished "bright" with a substantially transparent finish. Wood grain structures closely resembling the corresponding structures in real wood are clearly apparent, as at 26 and 28. Portions 26 simulate relatively open pore portions of the surface of a piece of a hardwood such as, for example, oak, while portions 28 represent the harder portions of natural wood grain structure. The skin sheet 16 is of substantially similar appearance, and imitates an opposite side of a door of the same real wood species.

The structure of each of the skin sheets 14 and 16 is critical to the ability of the present invention to provide a door 12 or other structures with an attractive appearance closely resembling actual wood with a "bright" finish.

Figure 2:
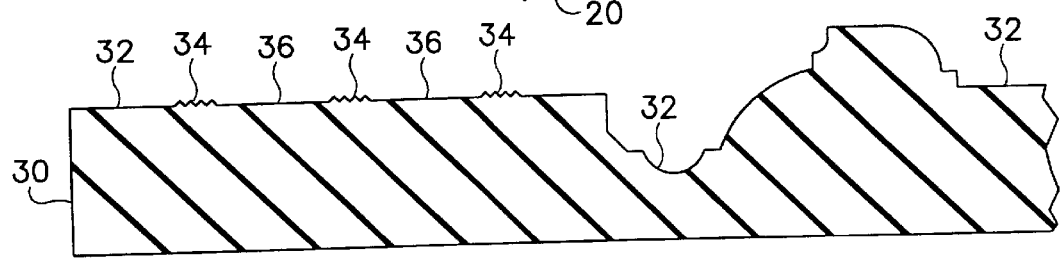
FIG. 2 is a sectional elevational view of a portion of a mold used to form a skin for an article such as the door shown in FIG. 1.

According to the present invention a door skin sheet 16, or a skin sheet for another article with a bright finished wood appearance, is manufactured by preparing a mold 30 to reproduce faithfully the details of the surface configuration of an actual wooden model structure. In preparing a door skin sheet 16, for example, an actual wooden door is manufactured, but its surface is left bare, and its grain structure is made clearly apparent and accentuated by carefully sanding and wire brushing the wood surfaces. The surface of the wooden model is then treated to prevent it from sticking to the material of which the mold is to be made, as by spraying the wood surfaces with an appropriate mold release compound. From the model a mold is made of material capable of reproducing fine detail, such as a conventional silicone rubber mold material using conventional mold preparation techniques. For example, an RTV silicone rubber compound available from Performance Silicones, Inc., of Chino, Calif., under stock number PSI 651B is suitable. The mold faithfully reproduces the minute surface irregularities of the wood grain of the model. As shown in FIG. 2, a mold surface 32 of the mold 30 thus includes irregularities such as the projections 34 corresponding to open pores in the grain of the surfaces of the wood of the model, while relatively smooth portions 36 of the mold surface 32 correspond to the slightly protruding harder portions of the grain of the wood of the model from which the mold 30 is made. Thus, the projections 34 in the mold 30 are intended to produce grain pore portions such as those in shown at 26 in FIG. 1, and the smoother parts 36 of the mold 30 are intended to produce correspondingly smooth areas such as those shown at 28 in FIG. 1.

It is of critical importance according to the present invention to produce a surface shape of an article such as a skin sheet 14 corresponding closely with the surface of the piece of wood to be imitated. The surface shape alone, however, is insufficient to obtain the desired appearance in the final product, as will be explained presently.

Figure 3:
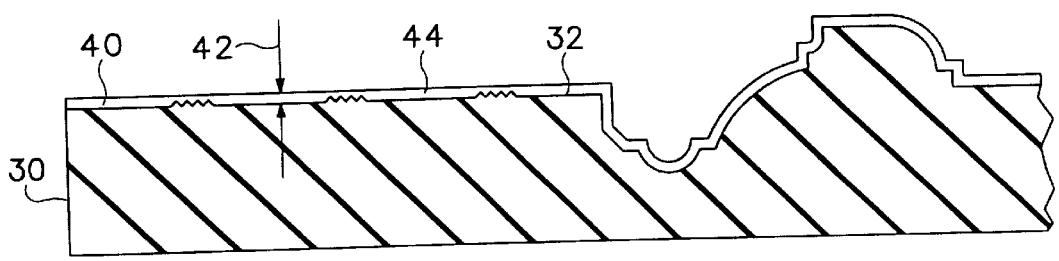
FIG. 3 is a view similar to that of FIG. 2 showing an outer layer of a transparent resin-based gel coat applied to the mold as part of the process of manufacturing a door skin.
Figure 4:
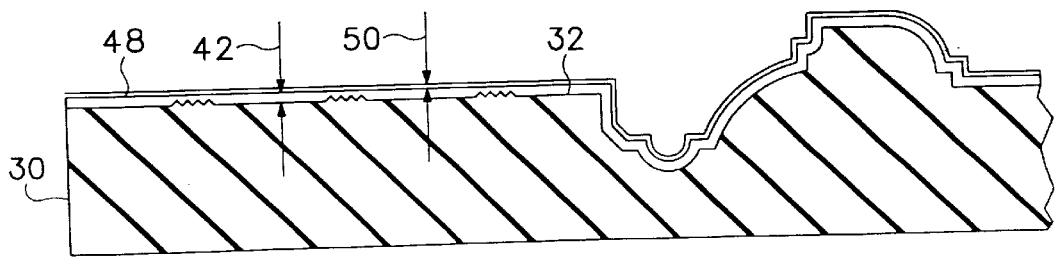
FIG. 4 is a view similar to FIG. 3 also showing the addition of a subsurface layer of a pigmented resin-based transparent outer gel coat material onto the transparent outer layer.
Figure 5:
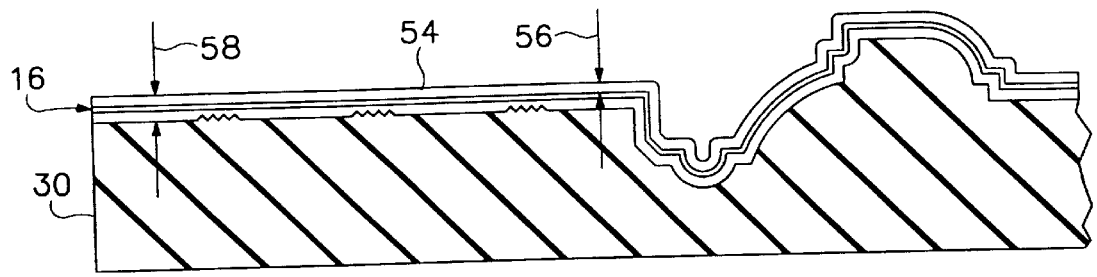
FIG. 5 is a view similar to FIG. 4 also showing the addition of a layer of reinforced resin to the previously present layers.

Referring next to FIG. 3, a skin sheet 14 or 16 is prepared by building up a succession of layers of material in the mold 30. After applying a suitable mold release compound (not shown) to the mold surface, a first, or outer layer 40 is applied to the mold surface 32, to an average thickness 42 of, preferably, about 0.018 inch, although a thickness as small as about 0.012 inch or as great as 0.020 inch would also be satisfactory. The outer layer 40 is of a transparent, preferably completely clear and colorless, resin-based gel coat material, although a slight coloration is acceptable, so long as the outer layer 40 remains essentially transparent. A preferred material for the outer layer 40 is a clear UV-curing unpromoted, polyester-based gel coat material available from NESTE Polyesters, Inc. of Ft. Smith, Ark., under the trademark NESTE MAXGUARD and designated as SL00221B, version #6. Such a gel coat material may be applied to the mold surfaces 32 to the required thickness in uncured form by conventional spray application, and is then cured, leaving a relatively smooth and regular inner surface 44 of the outer layer 40. The preferred material includes fillers and UV resistant components, but is flexible enough to withstand removal of the skin sheet 14 or 16 from the mold 30 without cracking.

When the outer layer 40 has been cured according to the manufacturer's instructions, a subsurface layer 48 of pigmented gel coat material is applied to it and cured as it remains in the mold 30, in a thin but complete coat having a thickness 50 preferably sufficient for the subsurface layer 48 to be substantially opaque and to appear solidly colored as viewed through the outer layer 40.

Preferably, the subsurface layer 48 is a polyester-based gel coat material with a uniform pigmentation similar in color to the lightest color present in the species of wood intended to be imitated by the skin sheet being prepared. As an example, using NESTE MAXGUARD base color gel coat material in a thickness 50 of at least about 0.003 and preferably about 0.005–0.010 inch provides the needed opacity and definite color to be visible with an appearance of depth beneath the outer surface 44 of the outer layer 40. For an imitation of mahogany a soft salmon color pigment such as that available as NESTE's Mahogany gel coat NG32626, version #4, provides a good result, while for imitating oak a pinkish tan color such as NESTE's Pink Rose gel coat RG31515, Version #3, is satisfactory.

The combination of the textured transparent outer layer 40 and the pigmented subsurface layer 48 result in the desired appearance of the finished skin sheet 14 according to the invention once the outer layer 40 has been stained and provided with a protective coating material, as will be described subsequently.

Once the subsurface layer 48 has been cured, a structural support layer 54 is applied to adhere to the subsurface layer 48 to provide structural support for both the outer gel coat layer 40 and the subsurface gel coat layer 48. The structural support layer 54 may be, for example, of a conventional resin with embedded glass fibers. For example, a 3-ounce matt of glass fiber strands such as a VETROTEX CERTAINTEED continuous filament glass fiber matt impregnated with an AOC ultraviolet curing polyester resin layer may be applied to adhere closely to the exposed inner surface of the subsurface layer 48. A preferred resin for the structural support layer 54 is an ultraviolet cured polyester resin RX1270 available from Alpha Owens Company of Perris, Calif. In small spaces and corners of small radius, a suitable polyester-based adhesive putty such as "PolyBond B38," available from A.T.C. Chemical, Inc., of Buffalo. N.Y., is used to avoid air pockets between the subsurface gel coat layer 48 and the glass-reinforced resin of the structural support layer 54. The fiber-reinforced structural support layer 54 is then cured to complete the skin sheet 16. Preferably, the cured structural support layer 54 has a thickness 56 of about 70 mils, to make the overall thickness 58 of the skin sheet 16 of the door 12 equal about 3/32 inch, although other articles may require different thicknesses.

Figure 6:
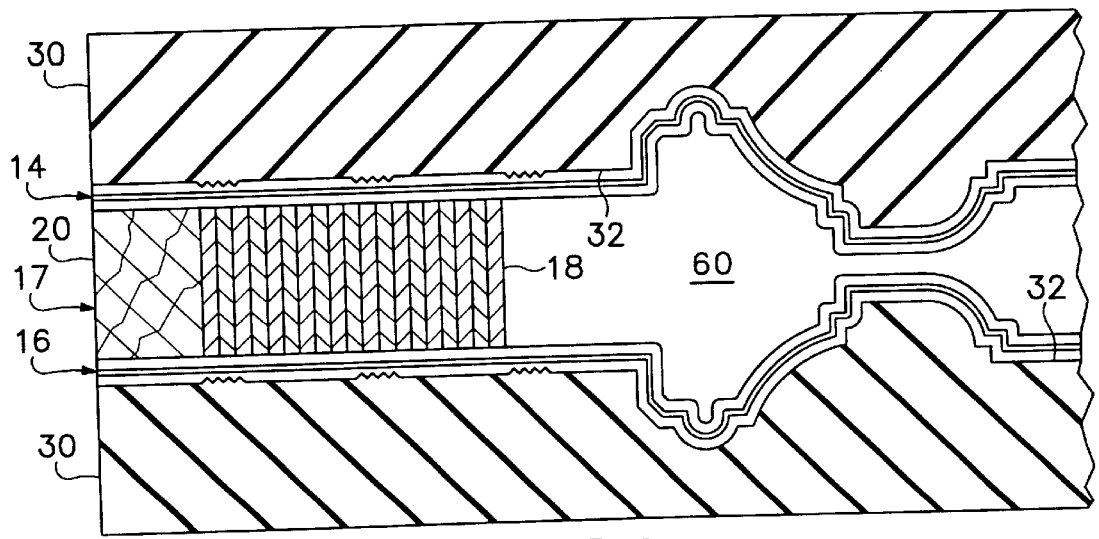
FIG. 6 is a sectional view of a portion of a door according to the present invention, taken in the direction indicated by line 6—6 in FIG. 1, at an intermediate stage in the manufacture of such a door.

A pair of skin sheets 14 and 16 prepared as just described are preferably kept in their respective molds 30, and an appropriate adhesive material such as the previously mentioned "Plastic Welder II" is applied to appropriate portions of the surface of each structural support layer 54. The two molds 30 containing and supporting the skins 14 and 16 are then placed in properly registered locations to adhere to the frame structure 17, as shown in FIG. 6, with each mold 30 adequately supported and pressed toward the frame structure 17 by a rigid caul (not shown).

Figure 7:
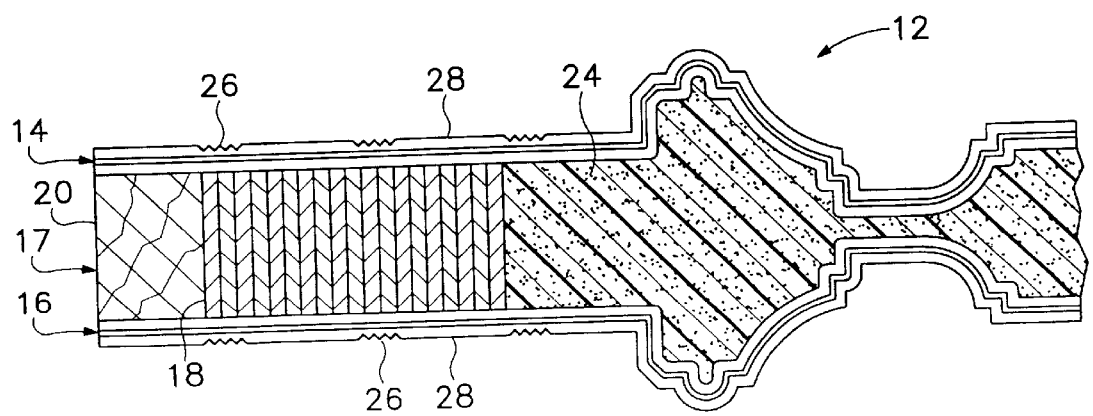
FIG. 7 is a view similar to FIG. 6 showing the portion of a door at a subsequent stage of manufacture.

The skin sheets 14 and 16, together with the frame structure 17, define a cavity 60, into which an appropriate quantity of a self-foaming resin mixture is placed. The molds 30 are supported adequately to resist the force generated while the foam material expands to form a foam core 24 fully filling the cavity 60 and adhering to the exposed surfaces of the structural frame 17 and the structural support layer 54 of each of the skin sheets 14 and 16. The foam is formed in place by pumping in the appropriate quantity of freshly mixed foam forming compound after the skin sheets 14 and 16 have been attached to the structural frame. The preferred core density of 28 lbs/ft$^3$ when expanded to fill the space within the shell of the door 12 is slightly less than that of real wood. The resin foam solidifies to form a substantially rigid microcellular foam core 24, shown in FIGS. 1 and 7.

After the foam core 24 has solidified and no longer urges the skin sheets 14 and 16 outwardly apart from each other, the molds 30 may be removed from the skin sheets 14 and 16. The skin sheets 14 and 16 can then be trimmed to the proper finished dimension flush with the surface piece 20 of each of the stiles and rails of the structural frame 17. As shown in FIG. 8, the resulting door 12 includes a pair of skin sheets 14 and 16, the structural frame 17, and the foam core 24, all of which are adhesively unified into a rigid structure having the weight and a feeling of solidity similar to that of a real wooden door of comparable size.

Figure 10:
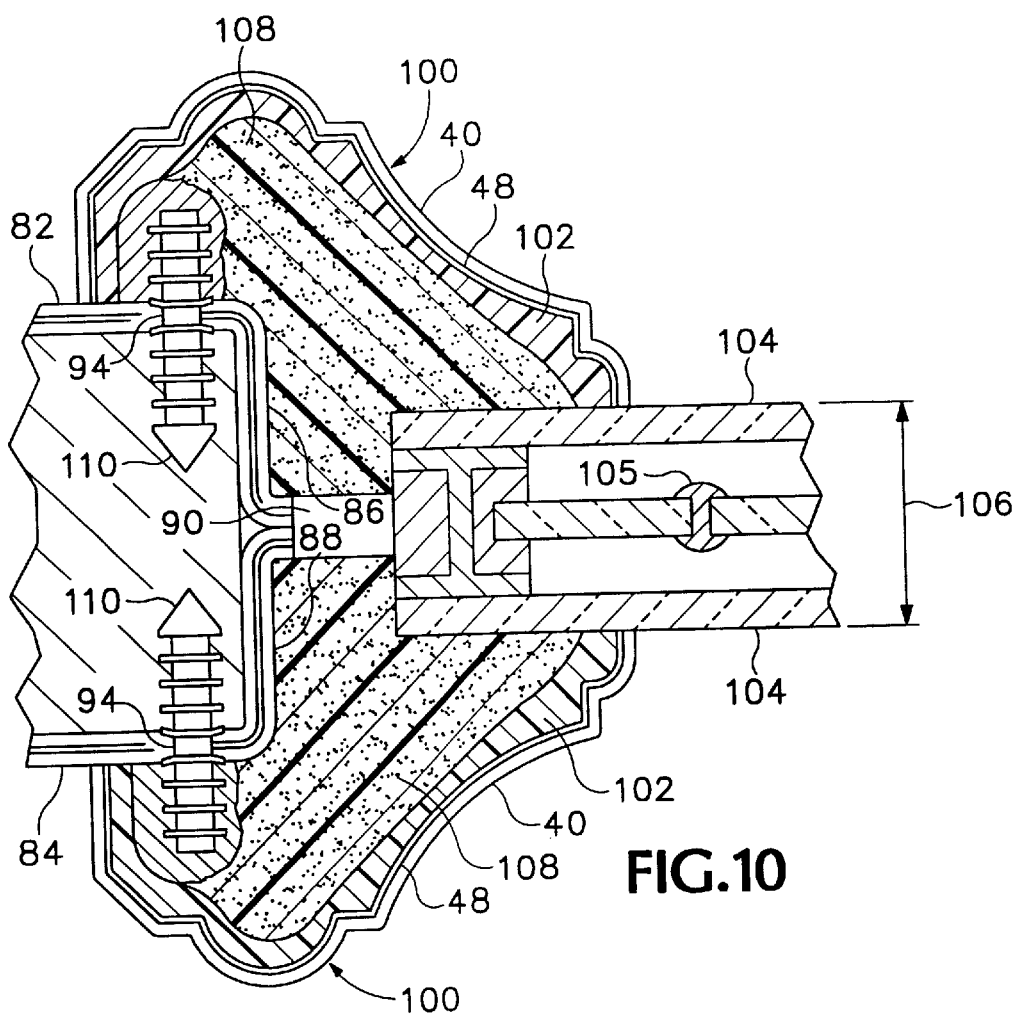
FIG. 10 is a sectional detail view at an enlarged scale showing a portion of the door shown in FIG. 9, with moldings in place to securely mount a glazing panel within the opening.

Referring to FIGS. 9 and 10, for a door 80 similar to the door 12, but in which it is desired to have a glass panel, the door is prepared generally according to the same method set forth with respect to the door 12, except that the skin sheets 82, 84 include lips or flanges 86, 88 surrounding an area where a panel is to be placed and directed inwardly toward each other to exclude the foam from where the panel is to be placed. Once the molds have been removed from the door 80, and in conjunciton with trimming the door skin sheets and surface pieces of the structural frame, a suitable opening 90 is cut through the door 80 to receive the intended glass panel 92 or the like, and a set of fastener receiving holes 94 are drilled in predetermined locations adjacent to the opening 90 defined in the door 80 and surrounded by the flanges 86 and 88. Suitable locations of the fastener receiving holes 94 are shown in FIG. 10, for example.

A pair of moldings 100 are prepared using the same method used to prepare the skin sheets 14, 16, 82, and 84, so that the exterior surfaces of the moldings 100 also include the wood grain shape details in an outer layer 40 of transparent gel coat material beneath which is a subsurface layer 48 of pigmented gel coat material, and beneath which is a structural support layer 102. The structural support layer 102 may be substantially thicker than the structural support layer 54 of a skin sheet, since the molding is likely to be subjected to substantially greater and more concentrated stresses, as a result of its function in supporting a heavy glass panel 92. The glass panel 92 has a substantial weight, since it is triple-glazed and includes not only inner and outer smooth panes 104 of full size, but metal caming 105 supporting multiple pieces of decorative glass, with a total thickness 106 which may be, for example, 1 inch.

Each of the moldings 100 also is provided with a foam core 108, which may be machined to fit against the skin sheet 82 or 84 and the flange 86 or 88, as shown in FIG. 10. In conjunction with shaping the foam core 108, sockets are machined and self-locking fasteners 110 to be received in the fastener receiving holes 94 are mounted in predetermined locations in the moldings 100. The locations of the fasteners 110 are preferably established in the moldings 100 with the moldings 100 held in a suitable jig, and the fasteners 110 are then set precisely in an epoxy or other suitable adhesive 111 so that each fastener 110 is rigidly and securely fastened to the structural support layer 102 of the molding 100.

The self-locking fasteners are capable of being received in appropriate holes and thereafter securely resisting withdrawal. They do not require rotation during insertion, so there is no need for a hole extending through to the outside of the molding 100. A suitable self-locking fastener is of a molded synthetic plastic resin and is available from Aveco, of Detroit, Mich., as its number AVI4036 fastener.

One molding 100 may be placed into the required position in registration with the opening and the flange 88 in the skin sheet 84 on one side of the door 80 after applying a quantity of an adhesive material to the skin sheet 84. When the molding 100 is pushed toward the skin sheet 84 the self-locking fasteners 110 associated with that molding are also pushed into the fastener receiving holes 94 in the skin sheet 84. The fasteners thus securely establish the position of the molding 100 with respect to the door 80, particularly during the time while the adhesive material cures. With one molding 100 in place in the door 80, the glass panel 104 can be placed properly with respect to the first molding 100, after which the other skin sheet 82 is provided with an appropriate layer of adhesive material and the second molding 100 is placed against the opposite side of the door 80 and pushed into place so that its fasteners 110 enter the fastener receiving holes 94 in the skin sheet 82 locking that molding 100 into the required position with respect to the door 80.

Figure 11:
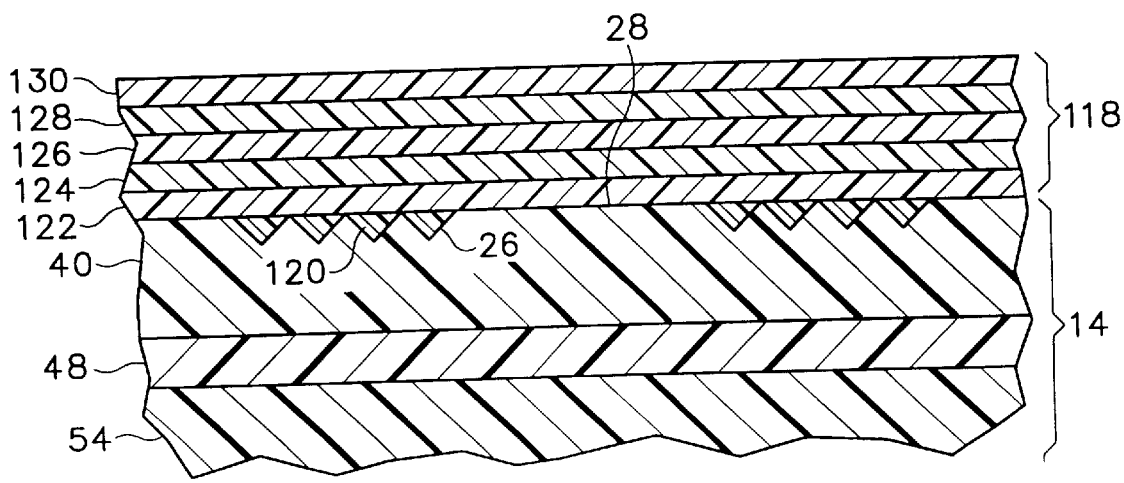
FIG. 11 is a sectional detail view showing a portion of the door shown in FIG. 1 and showing the layers of one system of stain and protective finish coats.

Referring to FIG. 11, once the skin sheets 14 and 16 and, to the extent necessary, the surface pieces 20 of the frame structure 17 of the door 12 or the corresponding portions of the door 80 have all been trimmed to the required size, and moldings 100 have been installed, the entire door 12 or 80 can be provided with a protective, preferably clear and transparent, finish 118. This is accomplished by application of a stain such as a wood stain applied in a conventional manner to fill the grain pores 26 and, to a lesser extent, to cover and color the portions 28 representing the hard part of the wood grain represented by each skin sheet or molding. As when staining a real wood surface, it may be preferable to use a stain system installed in two coats, first applying a filler coat 120 to fill the pore portions 26. For example, Sherwin-Williams grain filler in the appropriate color for the wood being imitated, available from the Sherwin-Williams Co. of Cleveland, Ohio, may be used. Thereafter, a second, thinner, layer 122 of stain is applied in generally the same manner used in staining real wood of the same type. For the stain coat 122, Sherwin-Williams oil-based stain is used in the appropriate color to match the grain filler 120. Once the stain has been applied in the usual fashion, a durable protective finish coating such as laquer, varnish, or a synthetic resin finish is applied in much the same manner as in finishing wood, to coat the stain protectively with a hard, scratch-resistant, transparent surface coat having the desired glossy, matte, or satin surface texture. For example, two coats 124 and 126 of an acrylic urethane sealer coating such as Sherwin-Williams Acry Glo Base Clear are applied followed by two coats 128 and 130 of a clear acrylic finish coat such as Sherwin-Williams Acrylic Top Coat.

The combination of the transparent outer layer 40, with its thickness 42, and the pigmented subsurface layer 48, give an appearance of a certain depth, so that with stain on the textured outer surface of the outer layer 40 and the protective finish coatings over the layer 122 of stain the resulting appearance closely resembles that of a real wood surface that has been stained and coated with a similar laquer, varnish, or synthetic finish material.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A skin sheet for a product of composite plastics resin structure imitating the appearance of wood, comprising:
    (a) an outer layer of transparent gel coat material having an outer surface molded to replicate the shape of a wood grain surface;
    (b) a subsurface layer of pigmented gel coat material adhered to and located adjacent said outer layer; and
    (c) a structural support layer of fiber-reinforced synthetic resin material adhering to and supporting said subsurface layer.

2. The skin sheet of claim 1 wherein said subsurface layer is clearly visible through said outer layer.

3. The skin sheet of claim 1 wherein said outer layer has a thickness in the range from about 0.012 inch to about 0.020 inch.

4. The skin sheet of claim 1 wherein said outer layer has a thickness of about 0.018 inch.

5. An article of composite construction imitating a wooden item, comprising:
    (a) a structural frame having a pair of opposite faces;
    (b) a skin of reinforced resin composition adhered to one of said opposite faces of said structural frame, said skin defining an opening therethrough for receiving a panel;
    (c) a panel located within said opening and filling substantially all of said opening; and
    (d) molding of reinforced resin composition extending adjacent said skin and said panel and overlying said skin and said panel and helping to hold said panel in place relative to said skin, said molding being located precisely with respect to said skin by a self-locking fastener extending through a receiving hole located in a predetermined position in said skin.

* * * * *